Sept. 24, 1940.   H. J. WALBERG ET AL   2,215,676
APPARATUS FOR WELDING TUBING
Filed Oct. 4, 1937   2 Sheets-Sheet 2
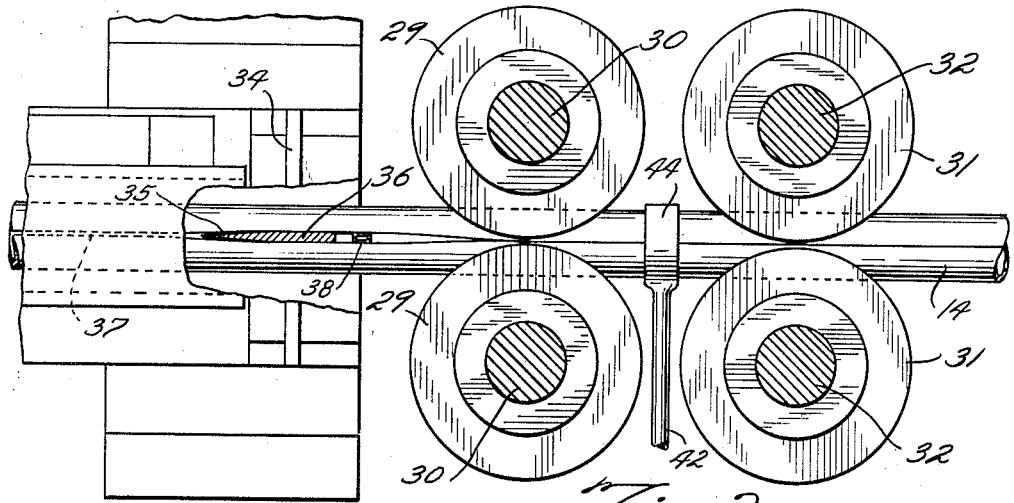
Fig. 2.
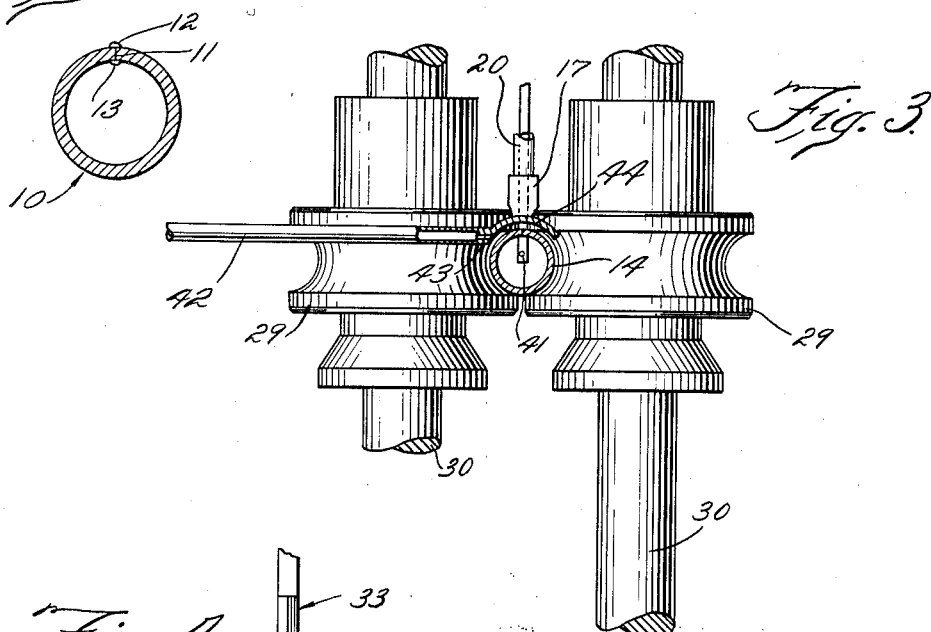
Fig. 5.
Fig. 3.
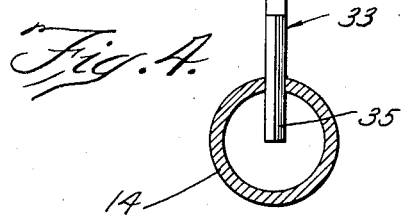
Fig. 4.
Inventors:
Herbert J. Walberg,
& Edward F. Peters.
By: Edward C. Gritzbaugh
Atty.

Patented Sept. 24, 1940

2,215,676

UNITED STATES PATENT OFFICE 2,215,676

APPARATUS FOR WELDING TUBING

Herbert J. Walberg, Chicago, and Edward F. Peters, Chicago Heights, Ill., assignors to Borg-Warner Corporation, Chicago, Ill., a corporation of Illinois Application October 4, 1937, Serial No. 167,126

2 Claims. (Cl. 78—83)

This invention relates to apparatus for welding material, and particularly to apparatus for forming a continuous butt weld.

Steel tubing can be formed in a number of ways, one of which comprises curling a parallel-sided sheet into a cylindrical form and welding the abutting edges. When this method is employed, the curled sheet is most economically welded by passing the sheet through a furnace, bringing the abutting edges under a torch and then pressing the heated edges together to form a weld.

It has been found, however, that when the edges are pressed together a flash is formed at the seam on both the inside and outside of the tubing. The outer flash can be removed by a subsequent milling operation, but the inner flash cannot be economically removed, particularly if the tubing is relatively long. The presence of the inner flash makes the tubing unsatisfactory for constructions which require that the tubing be telescoped over a tube of smaller diameter.

The object of this invention is an apparatus for forming a seam weld without forming a flash on either side of the weld.

Another object is an apparatus for welding tubing which prevents the formation of a flash on either the inside or outside of the tubing.

These and other objects of this invention will become apparent from the following description when taken together with the accompanying drawings which form a part thereof, and in which:

Fig. 2 is a plan view of the apparatus sectioned along line 2—2 of Fig. 1;

Fig. 3 is an elevation of the apparatus sectioned along line 3—3 of Fig. 1;

Fig. 4 is a section taken through a tube about to be welded; and

Fig. 5 is a section through a tube welded in accordance with the methods of the prior art.

Figure 1:
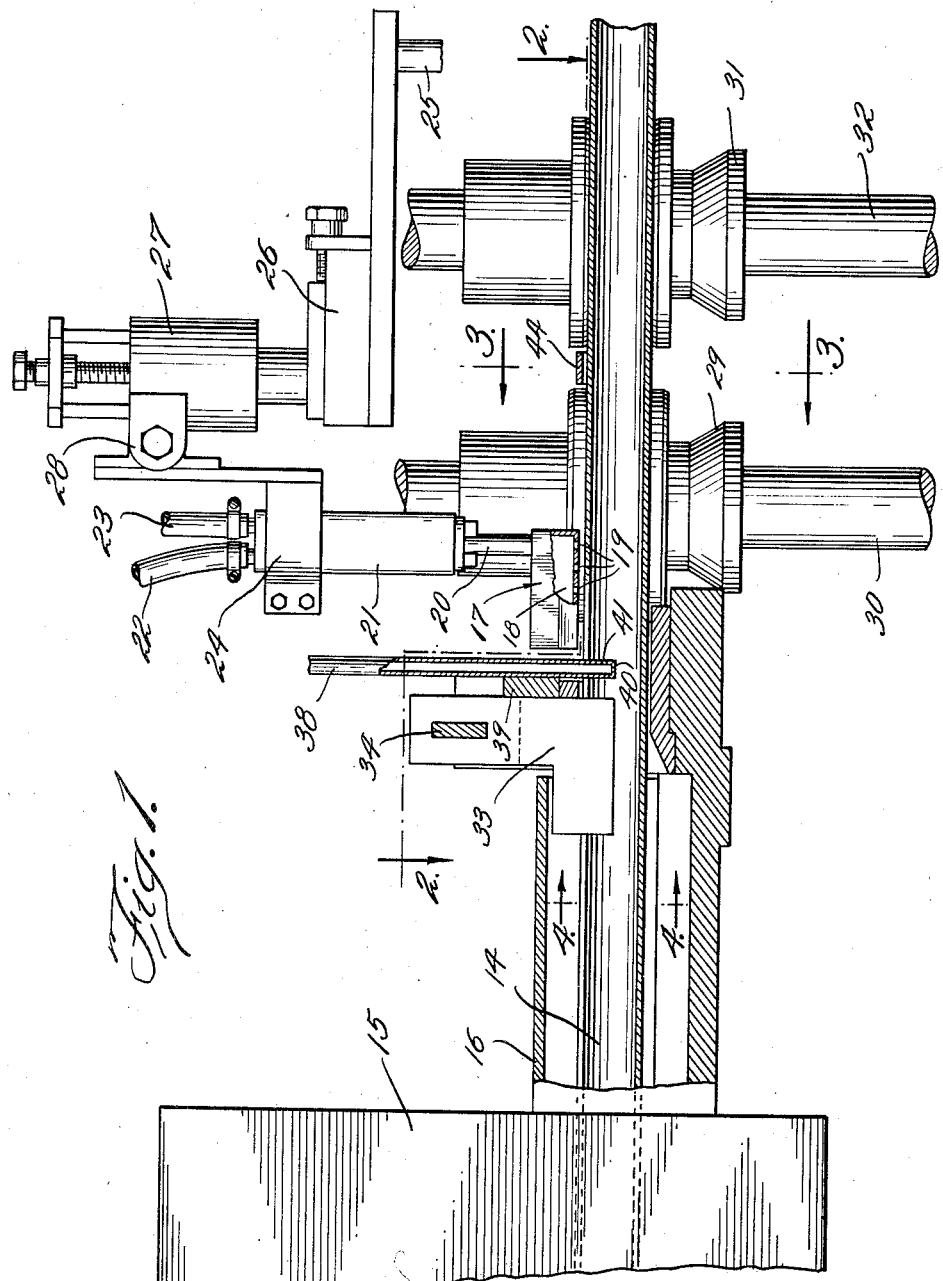
Fig. 1 is a side elevation, partly in section, of a seam welding apparatus embodying the principles of this invention.

In its preferred form, this invention comprises forming a butt weld by directing a stream of air upon the material of the weld simultaneously with the application of heat and pressure to the material to form the weld. The excess material which would ordinarily form the flash is blown away and the inner and outer surfaces of the tube are therefore smooth. The air is introduced into the tube ahead of the weld by means of a small pipe which is inserted into the open seam and which contains an orifice for directing the stream of air upon the weld. A second stream of air is introduced tangentially of the tube to remove the outer flash.

Referring now to the drawings for a detailed description of the invention, a tube 10 is shown in Fig. 5 which has been welded in accordance with methods used heretofore. The tube is welded at 11 and the outer and inner surfaces of the weld protrude beyond the normal surfaces of the tube to form flashes 12 and 13, respectively. These flashes are irregular in outline and are generally undesirable not only because they detract from the appearance of the tubing, but for practical reasons as well. The outer flash, if left on the tube, constitutes a hazard to those required to handle the tube, and both flashes render accurate telescoping of one tube over another impossible.

The apparatus shown in Figs. 1 to 4 constitutes a tube welding machine which is adapted to remove the undesirable flashes. The tube to be welded is shown at 14 emerging from a furnace 15 the function of which is to heat the tubing to render it workable and to reduce the amount of heat required to be added to raise the tubing to welding temperature. The tube is forced to the right (Fig. 1) through the furnace by suitable means (not shown) and has a generally circular cross-section as it leaves the furnace. A housing 16 surrounds tube 14 and prevents an unduly rapid dissipation of heat from the tube before it reaches the welding torch. Said welding torch is shown at 17 and comprises a generally rectangular chamber 18 having a series of nozzles 19 arranged in a row over the tube. Chamber 18 is connected by means of a pipe 20 to a mixing chamber 21 into which are fed oxygen and a combustible gas such as acetylene through hose connections 22 and 23 respectively. The entire torch assembly is supported over tube 14 by means of a clamp 24 which is in turn supported from a standard 25 through three adjustments, 26, 27 and 28. Adjustment 26 provides a means for moving torch 17 longitudinally of tube 14, adjustment 27 provides for transverse movement of torch 17 relative to tube 14 and adjustment 28 provides for vertical movement of the torch relative to the tube.

Located a short distance to the right (Fig. 2) of torch 17 are a pair of rolls 29 the peripheries of which are grooved with a curvature the radius of which is approximately the radius of the outer surface of tube 14. These rolls serve to bring the heated ends of the tube together to form a welded joint. Said rolls 29 are mounted on parallel shafts 30 which may be driven by any suitable means (not shown) at a speed such that the tube is not distorted by the rolls. A second pair of rolls 31, having the exact contour of the finished tube, contact the tube after it has been welded and serve to give the tube its correct form. The second pair of rolls is likewise mounted on parallel shafts 32 which may be driven from the same means as shafts 30.

Since the position of torch 17 relative to tube 14 is fixed during the welding operation, it is essential that the open seam of tube 14 is located properly relative to the torch to insure a uniform weld. A guide 33 is therefore mounted ahead of torch 17 and secured to the framework 34 of the machine by causing said framework to pass through a rectangular opening therein. Guide 33 has a tapered leading edge 35 and substantially parallel sides throughout the remainder 36 of its cross-section. Said parallel-sided portion of the guide is slightly thicker than the open seam 37 and hence serves to make the spacing between the ends of the tube uniform at the torch.

Between guide 33 and torch 17 is a small tube 38 the transverse width of which is no greater than the thickness of parallel-sided portion 36 of guide 33 to avoid undue strains in said tube 38 which might arise through contact with tube 14. Tube 38 may be welded or otherwise secured to a bar 39 which in turn is secured to the framework of the machine. Bar 39 also serves to absorb some of the thrust from guide 33. The bottom 40 of tube 38 is closed off and a small aperture 41 is drilled into the right-hand face (Fig. 1) at a slight angle to the axis of tube 14, such that the fluid in tube 38 is directed upward at the seam in tube 14.

Between rolls 29 and 31 is located a similar flash-removing device, which is directed at the removal of the outer flash. The device comprises a tube 42 having an aperture 43 and a guide vane 44 for directing the stream from aperture 43 in a curved path over the surface of the tube to be welded. Adjusting means (not shown) for properly locating tube 42 with respect to tube 14 may be used as with tube 38.

The operation of the apparatus is as follows:

The material for the tubing is fed into furnace 15 at a speed ranging preferably from ten to twenty-five feet per minute, although the welding speed is not limited to this range. The material may be pre-formed when inserted into the furnace, and is there heated to just below welding temperature. As it emerges from furnace 15, it is directed toward guide 33, leading edge 35 of guide 33 being inserted into the space between the edges of the material to obtain a uniform spacing therebetween and to direct the seam toward the torch. Rolls 29 and 31 are then rotated, torch 17 is lit and the fluid used in tubes 38 and 42 to remove the flashes is forced outward through nozzles 41 and 43 toward the seam. Several fluids operating at various pressures can be used, a satisfactory fluid being air under a pressure ranging from 60 to 80 pounds per square inch. Since nozzle 41 is directed toward the seam at the point where the flame from torch 17 is applied, it is apparent that not only will the force of the air stream remove scale and excess metal at the seam, but the oxygen in the air will aid the combustion of the gas used in the torch and supplement the oxygen supplied thereto. It has been found that approximately fifteen per cent. less oxygen is required to be mixed with the combustible gas in the torch when the air stream is used, which represents a substantial saving in the operation of the torch.

The tube 14, as it moves past the torch and the cooperating air stream from nozzle 41 becomes molten at the edges. Rolls 29 then compress the molten edges to weld them together and the constant pressure from the airstream blows off the molten inner flash as soon as it forms, together with any impurities which appear in the flash. After having passed welding rolls 29, the tube is acted upon by the second air stream, which is supplied from tube 42, and the outer flash is removed in much the same manner as the inner flash.

During this time tube 14 is still hot enough to be worked and as it passes rolls 31 the correct cylindrical form is given to it by these rolls. The procedure is continuous and uniform throughout the length of the tubing. When the last portion has passed rolls 31, the tube is allowed to cool to a temperature at which it can safely be handled.

In addition to the removal of the flash and economy in oxygen used in the torch, the weld formed by this procedure is more uniform, cleaner and stronger than welds formed by the process heretofore used. The tubing can be readily telescoped over smaller tubing and can be bent without cracking at the seam at a smaller radius than was formerly possible.

It is understood that the foregoing description is merely illustrative of a preferred embodiment of the invention, and that the invention, therefore, is not to be limited thereto, but is to be determined by the appended claims.

We claim:

1. Apparatus for continuously forming a seam weld in tubular material comprising means for heating the material, a wedge fixedly mounted with respect to the heating means for guiding and separating the edges of the material, heating means fixedly mounted adjacent the wedge for heating the separated edges to welding temperature, rolls cooperating with the tubular material for restoring the heated and separated edges to abutting relation whereby to weld the edges together, means in fixed relation to the wedge means and mounted between the heating means and wedge for directing a stream of air outwardly upon the heated edges to prevent the formation of a flash at the inside of the tubular material, and additional means adapted to direct a stream of air across the outside of the weld to prevent the formation of an outside flash.

2. Apparatus for continuously forming a seam weld in tubular material comprising means for heating the material, a wedge fixedly mounted with respect to the heating means for guiding and separating the edges of the material, heating means fixedly mounted adjacent the wedge for heating the separated edges to welding temperature, rolls cooperating with the tubular material for restoring the heated and separated edges to abutting relation, whereby to weld the edges together, means in fixed relation to the wedge means and mounted between the heating means and wedge for directing a stream of air outwardly upon the heated edges to prevent the formation of a flash at the inside of the tubular material, and additional means adapted to direct a stream of air across the outside of the weld, said additional means comprising a fixed tube, an arcuate extension on the tube in spaced relation to the tubular material, said tube having an opening for directing a stream of air in a chordal relation upon the tubular material, and said extension serving to deflect the air stream circumferentially across the welding edges.

HERBERT J. WALBERG.
EDWARD F. PETERS.